(12) United States Patent
Hu et al.

(10) Patent No.: US 8,375,565 B2
(45) Date of Patent: Feb. 19, 2013

(54) METHOD FOR PROVIDING AN ELECTRONIC LAPPING GUIDE CORRESPONDING TO A NEAR-FIELD TRANSDUCER OF AN ENERGY ASSISTED MAGNETIC RECORDING TRANSDUCER

(75) Inventors: Yufeng Hu, Fremont, CA (US); Zhongyan Wang, San Ramon, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 108 days.

(21) Appl. No.: 12/789,813

(22) Filed: May 28, 2010

(65) Prior Publication Data

US 2011/0294398 A1  Dec. 1, 2011

(51) Int. Cl.
*G11B 5/127* (2006.01)
*H04R 31/00* (2006.01)

(52) U.S. Cl. .............. 29/603.16; 29/603.12; 29/603.13; 29/603.14; 29/603.15; 29/603.18; 216/22; 216/39; 216/40; 360/324.11; 360/324.12; 360/324.2; 451/5; 451/41

(58) Field of Classification Search .............. 29/603.11, 29/603.13–603.16, 603.18; 360/324.11, 360/324.12, 324.2; 216/22, 39, 40; 451/5, 451/41
See application file for complete search history.

(56) References Cited

U.S. PATENT DOCUMENTS

| | | | |
|---|---|---|---|
| 4,670,732 A | 6/1987 | Church | |
| 4,675,986 A | 6/1987 | Yen | |
| 5,065,483 A | 11/1991 | Zammit | |
| 5,199,090 A | 3/1993 | Bell | |
| 5,210,667 A | 5/1993 | Zammit | |
| 5,463,805 A | 11/1995 | Mowry et al. | |
| 5,559,429 A | 9/1996 | Mowry et al. | |
| 5,597,340 A | 1/1997 | Church et al. | |
| 5,722,155 A | 3/1998 | Stover et al. | |
| 5,755,612 A | 5/1998 | Schaenzer et al. | |
| 5,816,890 A | 10/1998 | Hao et al. | |
| 5,876,264 A | 3/1999 | Church et al. | |
| 6,027,397 A | 2/2000 | Church et al. | |
| 6,034,849 A | 3/2000 | Takizawa | |
| 6,047,224 A | 4/2000 | Stover et al. | |
| 6,193,584 B1 | 2/2001 | Rudy et al. | |
| 6,330,488 B1 | 12/2001 | Yoshida et al. | |
| 6,347,983 B1 | 2/2002 | Hao et al. | |
| 6,399,401 B1 | 6/2002 | Kye et al. | |
| 6,532,646 B2 | 3/2003 | Watanuki | |
| 6,609,948 B1 | 8/2003 | Fontana, Jr. et al. | |
| 6,623,330 B2 | 9/2003 | Fukuroi | |
| 6,684,171 B2 | 1/2004 | Church et al. | |
| 6,699,102 B2 | 3/2004 | Reiley et al. | |
| 6,728,067 B2 | 4/2004 | Crawforth et al. | |
| 6,758,722 B2 | 7/2004 | Zhu | |

(Continued)

OTHER PUBLICATIONS

Bill Challener, "Plasmonic transducer for near field heat assisted magnetic recording", 2009 CMOS Emerging Technologies Workshop, Sep. 24, 2009, 19 pages.

*Primary Examiner* — Paul D Kim

(57) ABSTRACT

A method fabricates a transducer having an air-bearing surface (ABS). The method includes providing at least one near-field transducer (NFT) film and providing an electronic lapping guide (ELG) film substantially coplanar with a portion of the at least one NFT film. The method also includes defining a disk portion of an NFT from the portion of the at least one NFT film and at least one ELG from the ELG film. The disk portion corresponds to a critical dimension of the NFT from an ABS location. The method also includes lapping the at least one transducer. The lapping is terminated based on a signal from the ELG.

13 Claims, 15 Drawing Sheets

U.S. PATENT DOCUMENTS

| | | | |
|---|---|---|---|
| 6,795,630 B2 | 9/2004 | Challener et al. |
| 6,834,027 B1 | 12/2004 | Sakaguchi et al. |
| 6,857,937 B2 | 2/2005 | Bajorek |
| 6,884,148 B1 | 4/2005 | Dovek et al. |
| 6,950,289 B2 | 9/2005 | Lam et al. |
| 6,982,042 B2 | 1/2006 | Church et al. |
| 7,014,530 B2 | 3/2006 | Kasiraj et al. |
| 7,139,152 B2 | 11/2006 | Mahnad et al. |
| 7,149,061 B2 | 12/2006 | Yamakura et al. |
| 7,206,172 B2 | 4/2007 | Ding et al. |
| 7,215,629 B2 | 5/2007 | Eppler |
| 7,244,169 B2 | 7/2007 | Cyrille et al. |
| 7,245,459 B2 | 7/2007 | Cyrille et al. |
| 7,268,976 B2 | 9/2007 | Yamakura et al. |
| 7,271,982 B2 | 9/2007 | MacDonald et al. |
| 7,272,079 B2 | 9/2007 | Challener |
| 7,272,883 B2 | 9/2007 | Le et al. |
| 7,287,316 B2 | 10/2007 | Kasahara et al. |
| 7,330,404 B2 | 2/2008 | Peng et al. |
| 7,333,300 B2 | 2/2008 | Church et al. |
| 7,359,152 B2 | 4/2008 | Matono et al. |
| 7,360,296 B2 | 4/2008 | Cyrille et al. |
| 7,393,262 B2 | 7/2008 | Biskeborn |
| 7,821,732 B2 | 10/2010 | Komura et al. |
| 7,861,400 B2 | 1/2011 | Lille |
| 7,936,531 B2 | 5/2011 | Tomikawa et al. |
| 7,996,986 B2 * | 8/2011 | Gokemeijer | 29/737 |
| 8,077,418 B1 * | 12/2011 | Hu et al. | 360/59 |
| 8,179,628 B2 | 5/2012 | Zhou et al. |
| 8,248,891 B2 | 8/2012 | Lee et al. |
| 8,248,896 B1 | 8/2012 | Yuan et al. |
| 2003/0112542 A1 | 6/2003 | Rettner et al. |
| 2003/0128634 A1 | 7/2003 | Challener |
| 2003/0137772 A1 | 7/2003 | Challener |
| 2003/0184903 A1 | 10/2003 | Challener |
| 2004/0001394 A1 | 1/2004 | Challener et al. |
| 2004/0179310 A1 | 9/2004 | Lam et al. |
| 2005/0023673 A1 | 2/2005 | Nowak |
| 2005/0052771 A1 | 3/2005 | Rausch et al. |
| 2005/0078565 A1 | 4/2005 | Peng et al. |
| 2006/0028770 A1 | 2/2006 | Etoh et al. |
| 2006/0044683 A1 | 3/2006 | Matono et al. |
| 2006/0103990 A1 | 5/2006 | Ito et al. |
| 2006/0126222 A1 | 6/2006 | Aoki et al. |
| 2007/0008660 A1 | 1/2007 | Yamakura et al. |
| 2007/0159720 A1 | 7/2007 | Sohn et al. |
| 2007/0165495 A1 | 7/2007 | Lee et al. |
| 2008/0005543 A1 | 1/2008 | Rychlik |
| 2008/0068748 A1 * | 3/2008 | Olson et al. | 360/110 |
| 2008/0072418 A1 | 3/2008 | Kondo et al. |
| 2008/0144215 A1 | 6/2008 | Hsiao et al. |
| 2008/0181560 A1 | 7/2008 | Suh et al. |
| 2008/0232225 A1 | 9/2008 | Cho et al. |
| 2010/0118664 A1 | 5/2010 | Nishida et al. |
| 2010/0142079 A1 | 6/2010 | Tanaka et al. |
| 2010/0157745 A1 | 6/2010 | Okada et al. |
| 2010/0208391 A1 | 8/2010 | Gokemeijer |
| 2010/0321814 A1 | 12/2010 | Zou et al. |
| 2011/0235480 A1 | 9/2011 | Goulakov et al. |
| 2011/0292774 A1 | 12/2011 | Osawa et al. |
| 2012/0230138 A1 | 9/2012 | Endo |

* cited by examiner

METHOD FOR PROVIDING AN ELECTRONIC LAPPING GUIDE CORRESPONDING TO A NEAR-FIELD TRANSDUCER OF AN ENERGY ASSISTED MAGNETIC RECORDING TRANSDUCER

BACKGROUND

FIG. 1 depicts a portion of a conventional energy assisted magnetic recording (EAMR) transducer 10. The conventional EAMR transducer 10 is used in writing to recording media 30. To do so, the conventional EAMR transducer 10 receives light, or energy, from a conventional laser (not shown in FIG. 1). The conventional EAMR transducer 10 includes a conventional waveguide 12, conventional pole 14, and a conventional near-field transducer (NFT) 16, as well as a grating 20. The conventional NFT 16 includes a disk portion 16B and a pin portion 16A. The disk portion 16B is wider in the direction perpendicular to the plane of the page than the pin portion 16A. Although termed a "disk portion", the portion 16B may have a shape other than a circle. Also shown is a laser spot 22 on the grating 20. Other components that may be part of the conventional EAMR transducer 10 are not shown.

In operation, the light from the spot 22 on the grating 20 is coupled to the conventional waveguide 12. The conventional waveguide 12 guides the light to the conventional NFT 16 near the air-bearing surface (ABS). The conventional NFT 16 focuses the energy from the waveguide 12 to an optical spot 32 on the media 30. A small region of the conventional media 30 is heated by the spot 32. This region becomes more magnetically soft. The conventional EAMR transducer 10 magnetically writes data to the heated region of the recording media by energizing the conventional pole 14.

Although the conventional EAMR transducer 10 may function, there are drawbacks. The dimensions of the conventional NFT 16 are desired to be carefully controlled. For example, the length of the pin portion 16A of the conventional NFT 10 may be desired to be controlled. This may be achieved by controlling the diameter of the disk portion 16B and the distance from the ABS to the disk portion 16B. Such control may be difficult to achieve using conventional manufacturing methods. Thus, fabrication of the conventional transducer 10 may be challenging.

Accordingly, what is needed is a system and method for improving the fabrication of an EAMR transducer

BRIEF SUMMARY OF THE INVENTION

A method and system for fabricating transducer having an air-bearing surface (ABS) is described. The method and system include providing at least one near-field transducer (NFT) film and providing an electronic lapping guide (ELG) film substantially coplanar with a portion of the at least one NFT film. The method and system also include defining a disk portion of an NFT from the portion of the at least one NFT film and at least one ELG from the ELG film. The disk portion corresponds to a critical dimension of the NFT from an ABS location. The method and system also include lapping the at least one transducer. The lapping is terminated based on a signal from the ELG.

DETAILED DESCRIPTION OF THE PREFERRED EMBODIMENTS

Figure 1:
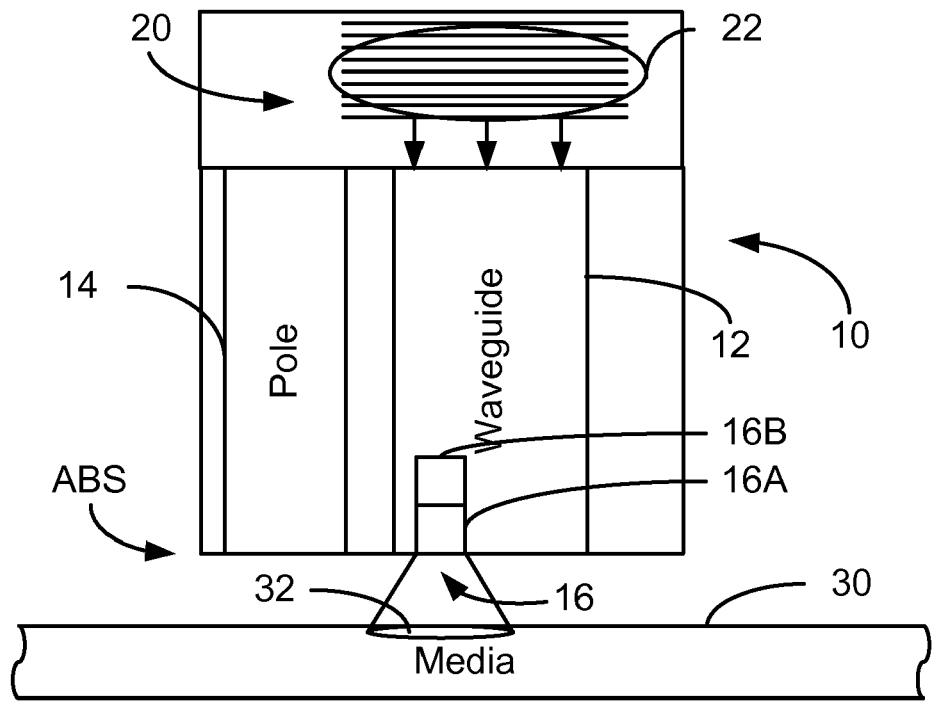
FIG. 1 is depicts a conventional EAMR transducer.
Figure 2:
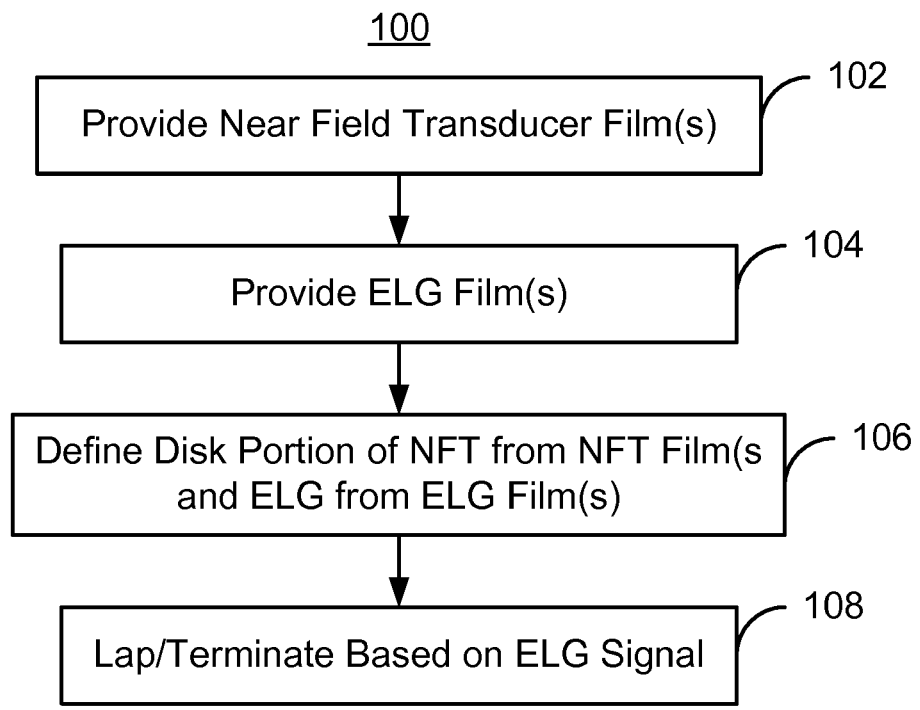
FIG. 2 is a flow chart depicting an exemplary embodiment of a method for fabricating an EAMR transducer.

FIG. 2 is an exemplary embodiment of a method 100 for providing an EAMR transducer including a near-field transducer (NFT). For simplicity, some steps may be omitted. The method 100 is described in the context of providing a single EAMR transducer. However, the method 100 may be used to fabricate multiple transducers at substantially the same time. The method 100 is also described in the context of particular structures. A structure or layer may include multiple materials and/or multiple sub-layers and may be formed using multiple sub-steps. Further, the method is described in the context of one electronic lapping guide (ELG) corresponding to one transducer. However, in some embodiments, one ELG may correspond to multiple transducers. Alternatively, a single transducer may correspond to multiple ELGs. The method 100 also may start after formation of other portions of the EAMR transducer. For example, the method 100 may commence after formation of a read transducer and a waveguide of the optics for an EAMR head. In addition, the method may be interleaved with formation of other portions of the EAMR transducer. For example, a writer including a main pole, a return pole, coil(s) and shield(s) may be formed between step 106 and 108 of the method 100.

At least one NFT film is provided for the transducer, via step 102. The NFT film(s) may be blanket deposited in the region in which the NFT is to be formed. In some embodiments, multiple films may be used for a single NFT. For example, a Ru film sandwiched between two gold films may be deposited as part of step 102. In other embodiments, a single film, such as a single gold film, may be used. In other embodiments other materials might be used for the NFT film. Step 102 may include depositing the NFT film(s) on a thin layer of optically transparent material that is to reside between the core of the waveguide and the NFT. For example, the NFT film(s) may be deposited on an aluminum oxide layer that is to make up part of the top cladding.

ELG film(s) substantially coplanar with a portion of the NFT film(s) are provided, via step 104. In some embodiments, step 104 includes blanket depositing a layer of Cr in the region in which the ELG is to be formed. In other embodiments, multiple films, or layers, may be deposited and/or other materials may be used. Step 104 may include providing the ELG film(s) on a thin layer of optically transparent material that is to reside between the core of the waveguide and the ELG. For example, the ELG film(s) may be deposited on an aluminum oxide layer that is to make up part of the top cladding. In some embodiments, therefore, the NFT film(s) and ELG film(s) may be deposited on the same surface in steps 102 and 104.

At least the disk portion of the NFT(s) and at least a portion of ELG(s) are defined, via step 106. Step 106 includes using a single mask to define the disk portion of the NFT(s) and the ELG(s). The disk portion of the NFT is defined from the NFT film(s), while the ELG(s) are defined from the ELG film(s).

The disk portion of the NFT corresponds to a critical dimension of the NFT. This critical dimension is from an ABS location to the outside diameter of the disk closest to the ABS location. The ABS location is the portion of the transducer which is to form the ABS. In some embodiments, the back edge of the ELG stripe corresponds to the portion of the disk closest to the ABS location.

In some embodiments, step 106 includes defining only the disk portion along with at least part of the ELG(s). Thus, the disk portion and pin portion of the NFT may be separately defined. In other embodiments, step 106 includes defining both the disk and pin portions of the NFT. In some embodiments, the disk and pin portions are formed from the same film. In such embodiments, a single removal step, such as an ion mill, may define the disk and pin portions of the NFT(s). The ion mill may also define at least part of the ELG.

In other embodiments, the disk and pin portions may be formed from multiple layers. In such embodiments, multiple removal steps may be carried out. For example, suppose the NFT is to be formed from two gold layers sandwiching a Ru layer. The disk portion and ELG masks may be provided from a single mask layer. The disk portion of the top gold layer and at least part of the ELG may then be defined using a first ion mill. A mask for the pin portion of the NFT may then be provided. The pin and disk portions for the bottom layer of gold and the bottom of the ELG may be defined. Thus, multiple ion milling steps may be used to define various portions of the NFT and the ELG. However, at least the disk portion of the NFT(s) and the ELG(s) are defined using the same mask. This mask may remain on the ELG(s) throughout formation. As a result, the ELGs' geometries and locations with respect to the disk portion of the NFT(s) may be determined by a single mask.

Once fabrication of the desired components of the transducer has been completed, the transducer is lapped to expose the ABS, via step 108. The lapping is terminated based on signal(s) from the ELG(s). More specifically, the lapping may be terminated when the signal from the ELG(s) indicates that the ABS is the desired distance (the critical dimension) from the front edge of the disk portion of the NFT(s). For example, the resistance of an ELG may be determined based upon the resistivity, which depends upon the material used, as well as geometry of the ELG. More specifically, the ELG stripe height is used in determining the resistance of the ELG. Thus, the resistance of the ELG may be used to determine the desired stripe height of the ELG and, therefore, the desired critical dimension for the NFT. When the transducer has been lapped to the desired ELG resistance, lapping is terminated.

Figure 3:
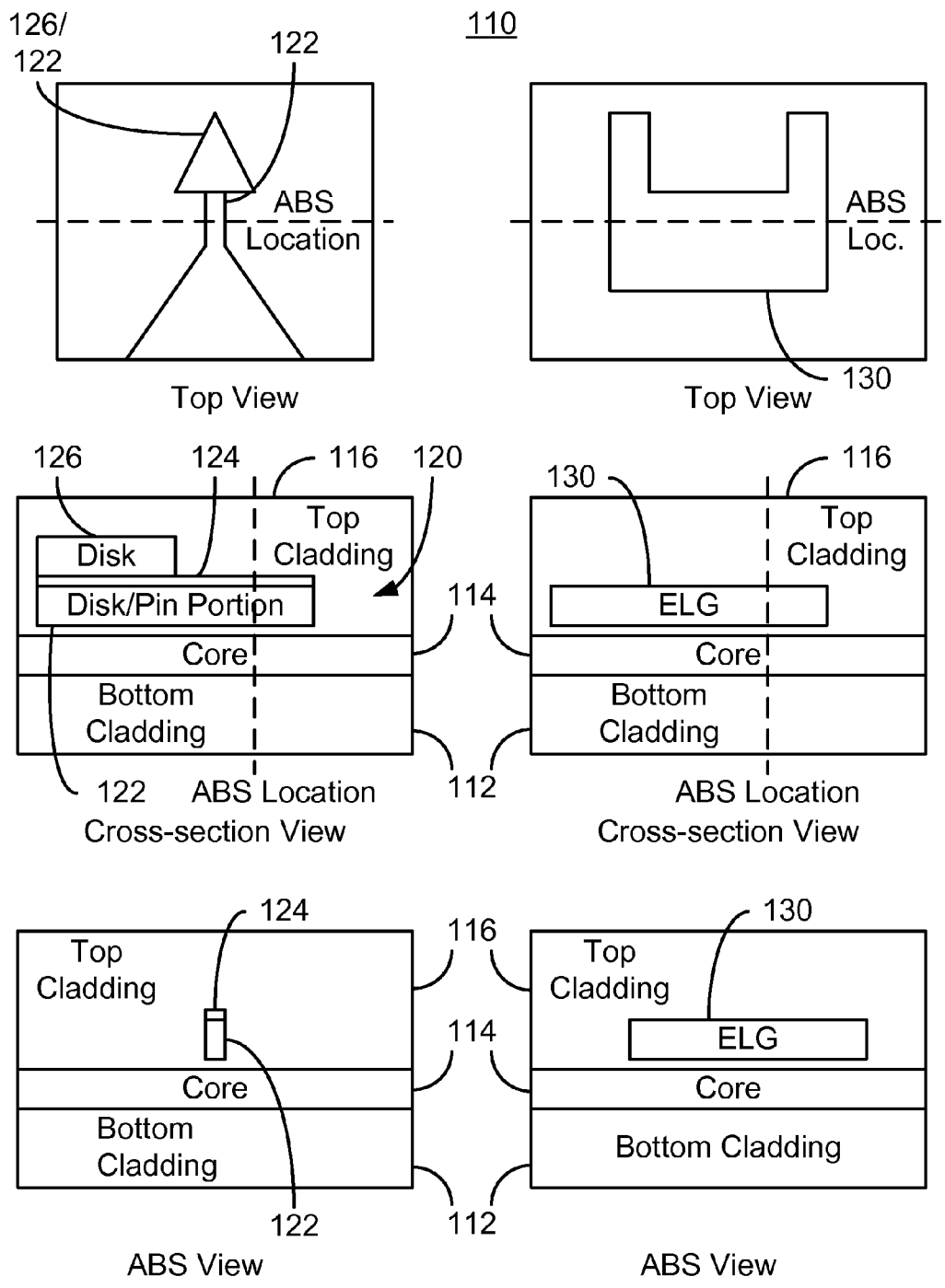
FIG. 3 depicts a portion of an exemplary embodiment of a magnetic recording transducer during fabrication.

FIG. 3 depicts plan/top, side, and cross-section views of an exemplary embodiment of a magnetic recording transducer 110 that may be formed using the method 100. For simplicity not all portions of the EAMR transducer 110 are shown. FIG. 3 is not to scale. In addition, although the transducer 100 is depicted in the context of particular components other and/or different components may be used. Thus, the EAMR transducer 110 shown in FIG. 3 may reside on a slider and be part of a merged head including a read transducer. In addition, the EAMR transducer 110 may be used in an EAMR disk drive including read transducer(s) (not shown). The portion of the EAMR transducer 110 shown may be considered to be part of the write transducer 110. However, for simplicity, not all components are shown. For example, magnetic components are not shown.

The EAMR transducer 110 includes a waveguide having a bottom cladding 112, a core 114, and top cladding 116. The waveguide may reside between the read transducer (not shown) and the write transducer (not shown). The transducer 110 includes an NFT 120 including a disk/pin portion 122, a disk portion 126, and a layer 124 therebetween. The bottom layer 122 includes both the triangular shaped disk portion and the pin portion of the NFT 120. The top layer 126 only includes the disk portion of the NFT 120. In the embodiment shown, the disk portion 126 is triangular in the top view. However, other shapes may also be used. For example, the disk portion may be circular (e.g. disk-shaped), rectangular, square, or have another shape. Further, shapes having different symmetries may also be used. In addition, anchor portion of the NFT 120 on the opposite side of the ABS location from the disk portion 122/126 is also shown. Thus, the transducer 110 is depicted after NFT formation, but prior to lapping to expose the ABS. The ABS location to which the EAMR transducer 110 may be lapped is also shown. Stated differently, the ABS location corresponds to the region where the ABS is to exist after lapping.

Also shown in FIG. 3 is ELG 130. The ELG 130 is generally desired to be sufficiently close to the NFT 120 to allow the ELG 130 to be used to control lapping of the NFT 120. In some embodiments, the ELG 130 is desired to be not more than approximately one hundred microns from the NFT 120. As can be seen in FIG. 3, the ELG 130 has been defined such that the back edge of the ELG coincides with the part of the disk portion 122/126 closest to the ABS location (front edge of the disk portion 126). In some embodiments the front edge of the disk portion 126 is at least twenty and not more than one hundred nanometers from the ABS location. Further, the ELG 130 may be defined in same step and using the same mask as the disk portion 122/126. As such, the relevant portions of the ELG 130 are aligned with the front edge of the disk portion 122/126. The back edge of the ELG 130 is thus substantially the same distance from the ABS location as the front edge of the disk portion 126. However, in other embodiments, the ELG 130 may be aligned to the disk portion 122/126 in a different manner. Overlay and similar issues which may cause misalignments between the ELG 130 and the disk portion 122/126 may be reduced or eliminated. The ELG 130 is used to determine when to terminate lapping. Because the ELG is better aligned with the disk portion 122/126, use of the ELG 130 may allow for the desired critical dimension for the NFT. Stated differently, the transducer 110 is lapped such that the ABS location corresponds to the distance between the ABS and the NFT front edge being the desired critical dimension. Thus, fabrication of the NFT 120 and the transducer 110 is facilitated.

Figure 4:
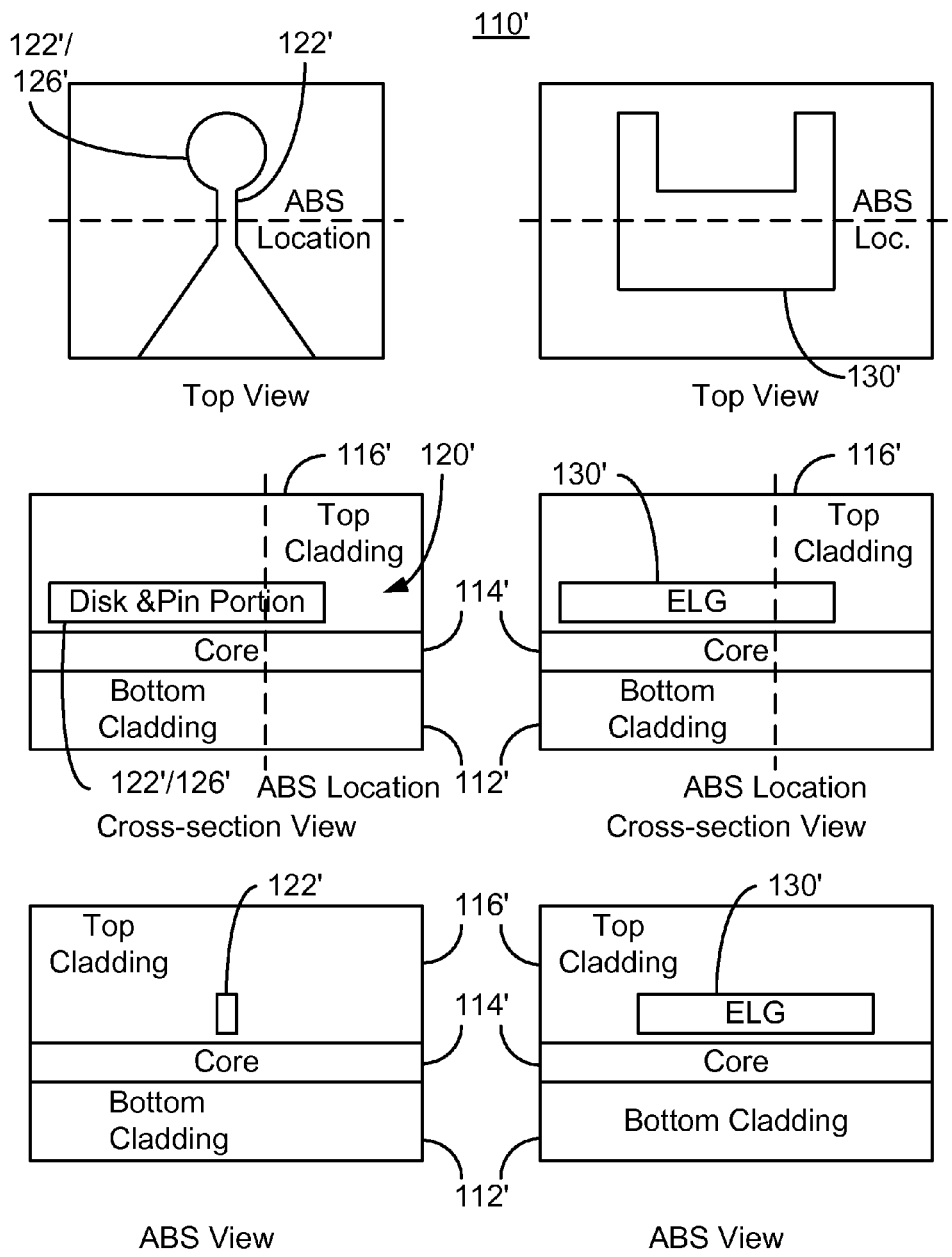
FIG. 4 depicts a portion of another exemplary embodiment of a magnetic recording transducer during fabrication

FIG. 4 depicts plan/top, side, and cross-section views of an exemplary embodiment of a magnetic recording transducer 110' that may also be formed using the method 100. For simplicity not all portions of the EAMR transducer 110' are shown. FIG. 4 is not to scale. In addition, although the transducer 100' is depicted in the context of particular components other and/or different components may be used. Thus, the EAMR transducer 110' shown in FIG. 4 may reside on a slider and be part of a merged head including a read transducer. In addition, the EAMR transducer 110' may be used in an EAMR disk drive including read transducer(s) (not shown). The portion of the EAMR transducer 110' shown may be considered to be part of the write transducer 110'. However, for simplicity, not all components are shown. For example, magnetic components are not shown.

The EAMR transducer 110' is analogous to the EAMR transducer 110 and thus includes analogous components. For example, the EAMR transducer 110' includes bottom cladding 112', core 114', top cladding 116', NFT 120', and ELG 130' corresponding to the bottom cladding 112, core 114, top cladding 116, NFT 120, and ELG 130, respectively. The NFT 120' includes a disk portion 122'/126' and a pin portion 122'. However, the disk portion 122'/126' and pin portion 122' are formed from the same layer. This is in contrast to the EAMR transducer 110 depicted in FIG. 3, in which the NFT 120 is formed of three layers 122, 124, and 126. Further, the disk portion 122'/126' is depicted as being circular in shape. However, other shapes including but not limited to triangles, squares, and rectangles may be used.

The EAMR transducer 110' has the ELG 130' and NFT 120' located and formed in a similar manner to the ELG 130 and NFT 120. As a result, the back edge of the ELG 130' corresponds to the front edge of the NFT disk portion 122'/126'. However, in other embodiments, the ELG 130' may be aligned differently with respect to the NFT 120'. Consequently, the ELG 130' may be used in a manner similar to the ELG 130 to lap the transducer 110' to the desired ABS location having the desired critical dimension for the NFT 120'. Further, issues such as misalignments due to overlay or analogous errors may be mitigated or eliminated. Thus, accurate fabrication of the NFT 120' and the transducer 110' may be facilitated.

Figure 5:
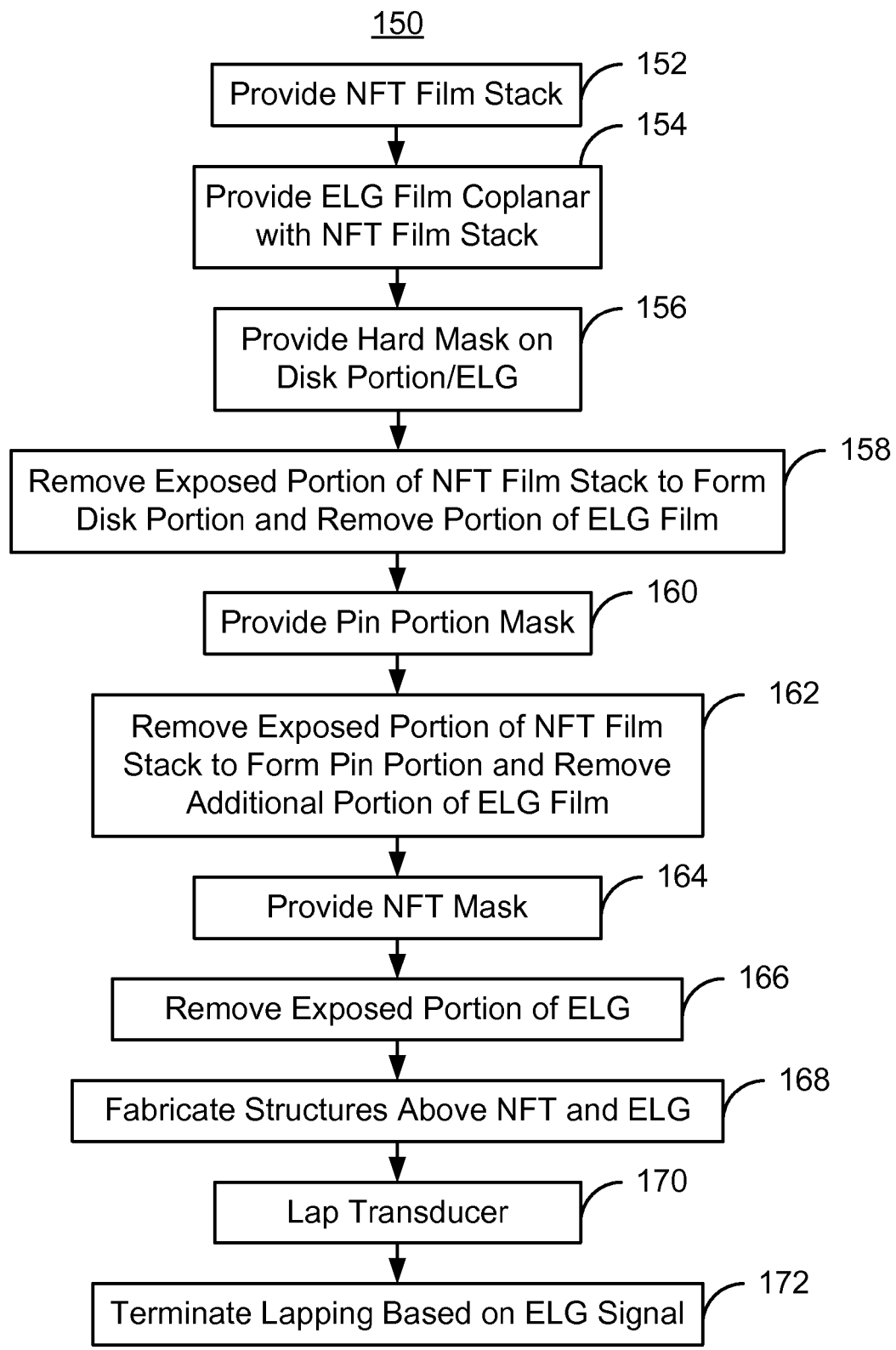
FIG. 5 is a flow chart depicting another exemplary embodiment of a method for fabricating a magnetic recording transducer.

FIG. 5 is a flow chart depicting another exemplary embodiment of a method 150 for fabricating a magnetic recording transducer. FIGS. 6-16 each depicts plan, cross section, and ABS views of an exemplary embodiment of an EAMR transducer 200 during fabrication. Note that the ABS view is taken at the ABS location, marked by dashed line in the top view in FIGS. 6-16. FIGS. 6-16 are not to scale. The method 150 is also described in the context of particular structures. A structure or layer may include multiple materials and/or multiple sub-layers. Structures may be formed using multiple sub-steps. The method 150 also may start after formation of other portions of the EAMR transducer. For example, the method 150 may commence after formation of a read transducer and components of a waveguide. In addition, the method may be interleaved with formation of portions of the EAMR transducer 200. For example, pole(s), shield(s), and coil(s) may be formed prior to lapping. For clarity, only a portion of the EAMR transducer 200 is shown. In addition, steps may be omitted or combined in the method 150. The method 150 is also described in the context of a single NFT and a single ELG corresponding to the NFT. However, multiple NFTs/transducers corresponding to a single ELG, multiple NFTs/transducers corresponding to multiple ELGs, and/or a single NFT/transducer corresponding to multiple ELGs may be fabricated using the method 150.

An NFT film stack is provided, via step 152. In some embodiments, step 152 includes depositing a first gold film, depositing a Ru film on the first gold film and depositing a second gold film on the Ru layer. In some embodiments, the NFT film stack may be blanket deposited in the region in which the NFT is to be formed. The layers may be deposited on a thin layer of optically transparent material that is to reside between the core of the waveguide and the NFT. For example, the NFT film stack may be deposited on an aluminum oxide layer that is to make up part of the top cladding. Step 152 is analogous to step 102 of the method 100.

ELG film(s) substantially coplanar with a portion of the NFT film stack are provided, via step 154. Step 154 is analogous to step 104. In some embodiments, step 154 includes blanket depositing a layer of Cr or other material(s) in the region in which the ELG is to be formed. In other embodiments, multiple films, or layers, may be deposited. Step 154 may include providing the ELG film on a thin layer of optically transparent material that is to reside between the core of the waveguide and the ELG. For example, the ELG film(s) may be deposited on an aluminum oxide layer that is to make up part of the top cladding. In some embodiments, therefore, the NFT film(s) and ELG film(s) may be deposited on the same surface in steps 152 and 154.

Figure 6:
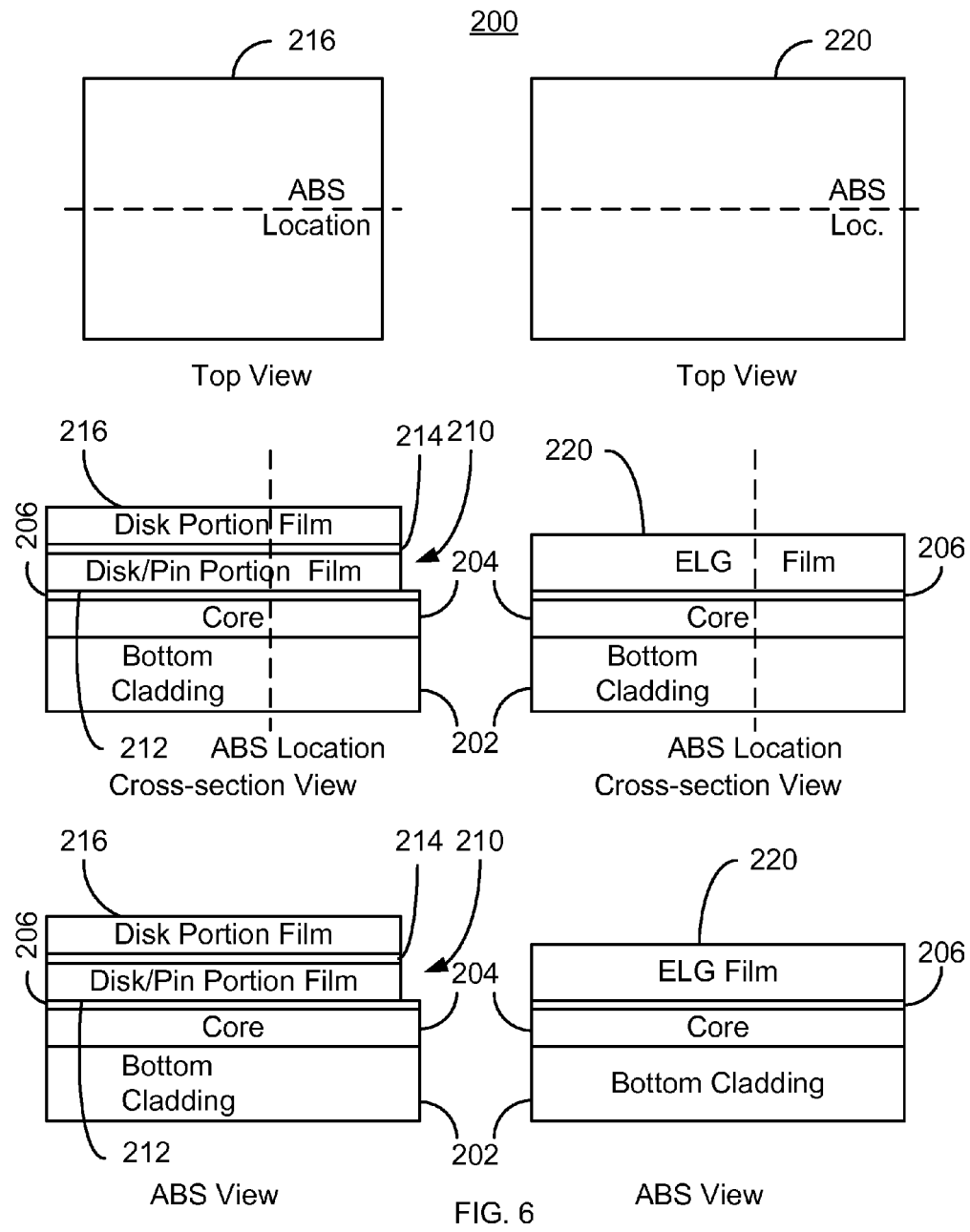
FIG. 6-16 depict plan, cross-section, and ABS views of an exemplary embodiment of an EAMR transducer during fabrication.

FIG. 6 depicts the transducer 200 after step 154 is performed. Thus, a waveguide has been partially formed. Thus, bottom cladding 202 and core 204 have been provided. Further, a thin layer 206 of optically transparent material has been deposited. The thin layer 206 and bottom cladding 202 may include materials such as aluminum oxide. The core 204 may include tantalum oxide. A NFT film stack 210 is also shown. The NFT film stack 210 includes a disk/pin portion (bottom) layer 212, a stop (middle) layer 214, and a disk portion (top) layer 216. Also shown is an ELG film 220. The ELG film 220 and the NFT film stack 210 are substantially coplanar. Thus, the NFT film stack 210 bottom and top are close to the bottom and top, respectively, of the ELG film 220. For example, the bottom of the disk/pin portion film 212, and thus the NFT film stack 210 and the bottom of the ELG film 220 both adjoin the top of the thin layer 206. Although the top of the disk portion film 216 and the top of the ELG film 220 are not shown as coplanar, in alternate embodiments, the top of the disk portion film 216 and the top of the ELG film 220 might be coplanar.

A hard mask is provided on the disk portion film 216 and on the ELG film 220, via step 156. The hard mask is used to define the disk of the NFT as well as at least a portion of the ELG. Thus, the same mask is used in defining the disk as in defining the ELG. In some embodiments, step 156 includes blanket depositing a sheet hard mask film, such as SiC. A photoresist mask for the disk of the NFT and the ELG are then provided. The pattern is transferred from the photoresist mask to the hard mask. This transfer may, for example, be achieved via ion milling or a reactive ion etch (RIE) of the hard mask layer 230.

Figure 7:
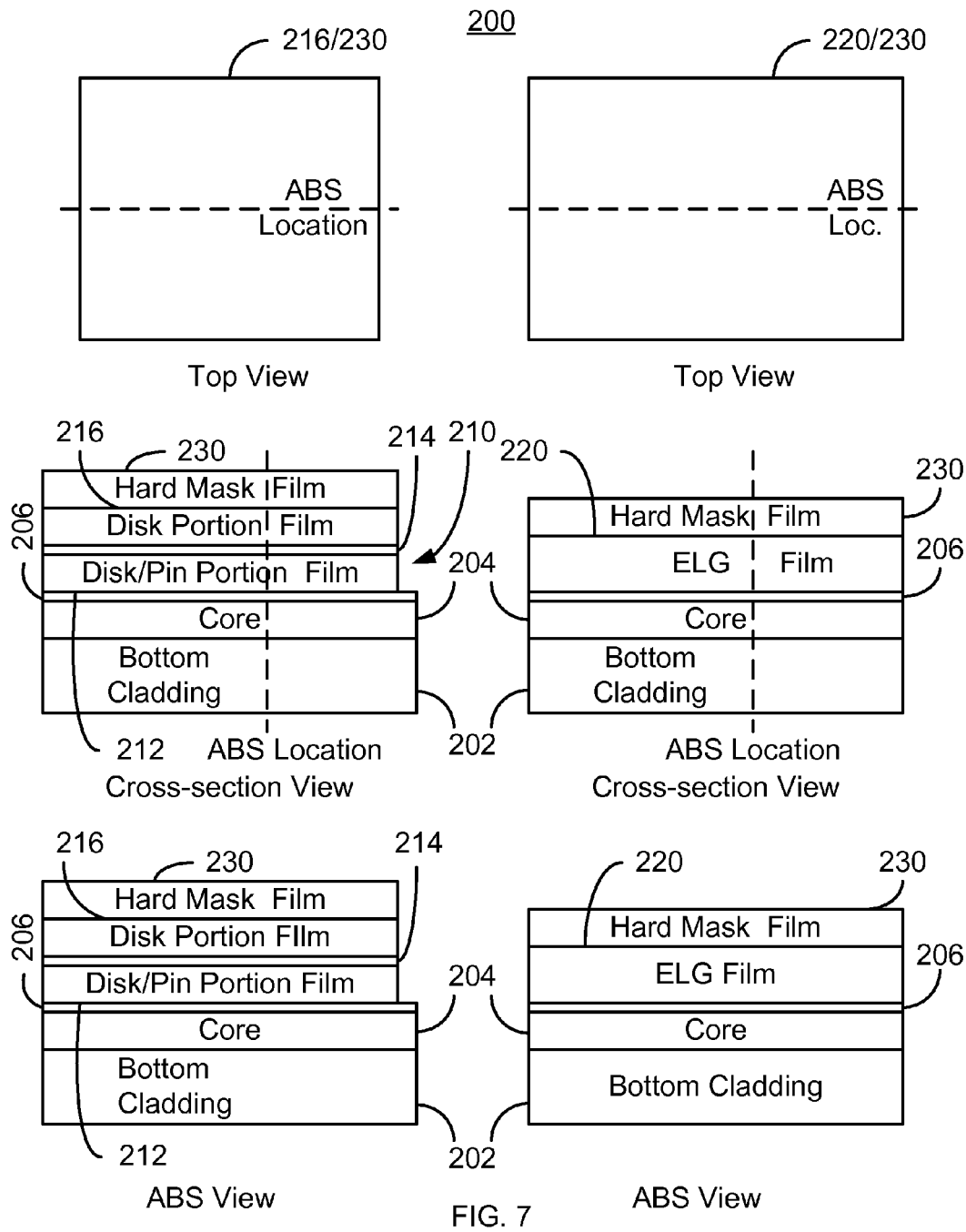
Figure 8:
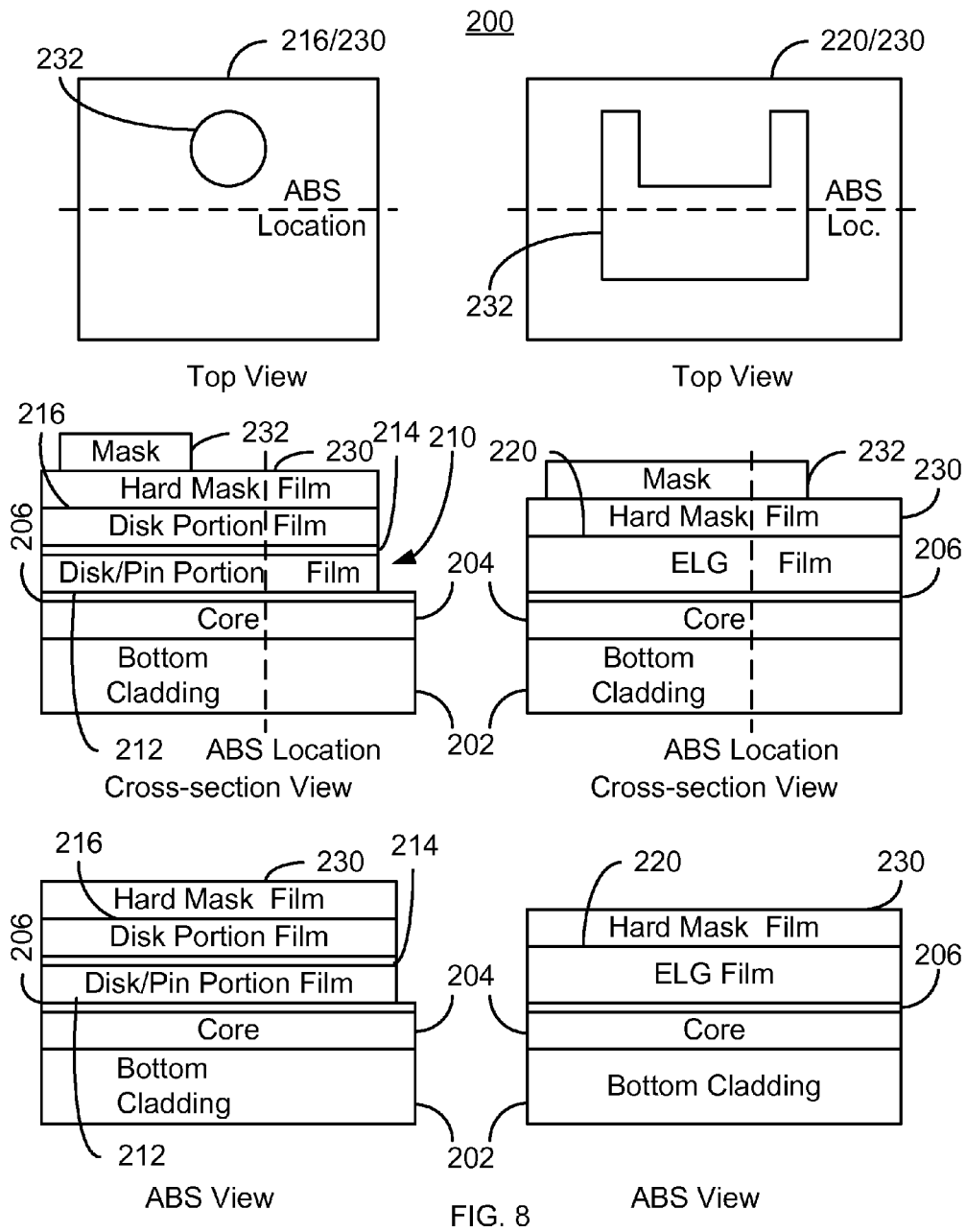
Figure 9:
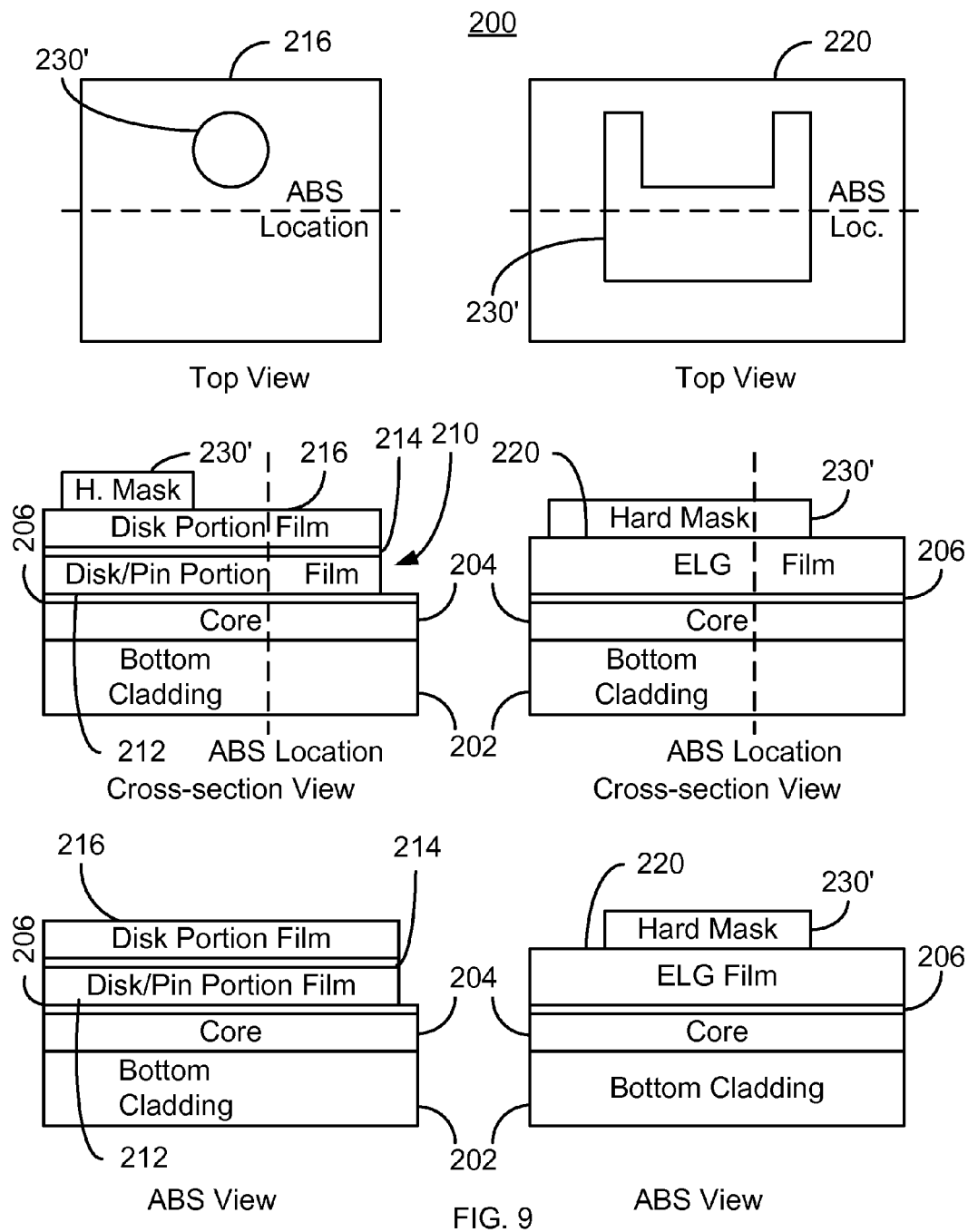

FIGS. 7-9 depict the transducer 200 during one embodiment of step 156. FIG. 7 depicts the transducer 200 after deposition of a hard mask film. Thus, hard mask film 230 is shown. The hard mask film 230 covers both the NFT film stack 210 and the ELG film 220. FIG. 8 depicts the transducer after the photoresist mask has been formed. Thus, mask 232 is shown. In other embodiments, a material other than photoresist may be used for the mask 232. The mask 232 has the shape and location of both the ELG and the disk portion of the NFT desired to be formed. FIG. 9 depicts the transducer 200 after the pattern of the mask 232 is transferred to the hard mask 230 and any remaining photoresist mask 232 stripped. Thus, hard mask 230' has taken the shape of the mask 232 (not shown in FIG. 9). The hard masks 230' for both the NFT and the ELG are formed together in a single photolithography process.

Figure 10:
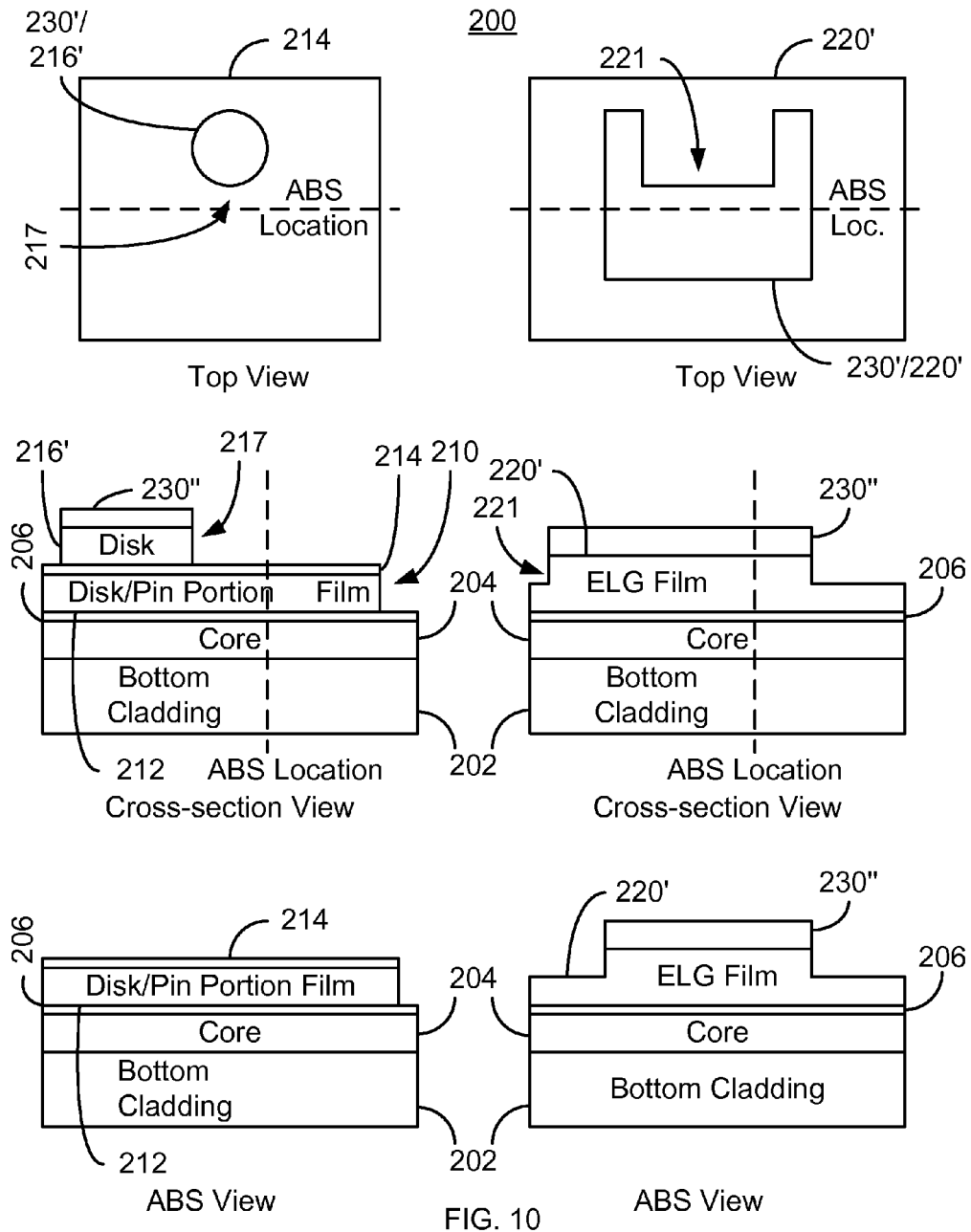

An exposed portion of the NFT film stack 210 is removed concurrently with a portion of the ELG film stack 220, via step 158. In some embodiments, the exposed portions of the gold disk portion film 216 are removed in step 158. In some embodiments, a first ion mill appropriate for the disk portion film 216 is used. This first ion mill terminates while a portion of the Ru film and a portion of the ELG film 220 remain intact. The Ru layer 214 may act as a stop layer for such a removal process. Endpoint detection may also be used to determine when the film 214 having a different composition than the disk portion film 216 is reached. Thus, at least a portion of the Ru film 214 and all of the disk/pin portion layer 212 remain. In some embodiments, the ELG film 220 is not completely etched through in step 158. FIG. 10 depicts the EAMR transducer 200 after step 158 is performed. Thus, both the disk portion 216' of the NFT and a portion of the ELG 220' have been defined. The disk portion 216' and part of the ELG 220' may be formed not only using the same mask, but also the same removal process. Step 156 and 158 are thus analogous to step 106 of the method 100. Further, in some embodiments, the back edge 221 of the ELG 220' corresponds to the front edge 217 of the disk portion 216' closest to the ABS location. However, in another embodiment, the alignment of the ELG 220' with the disk portion 216' may differ.

Figure 11:
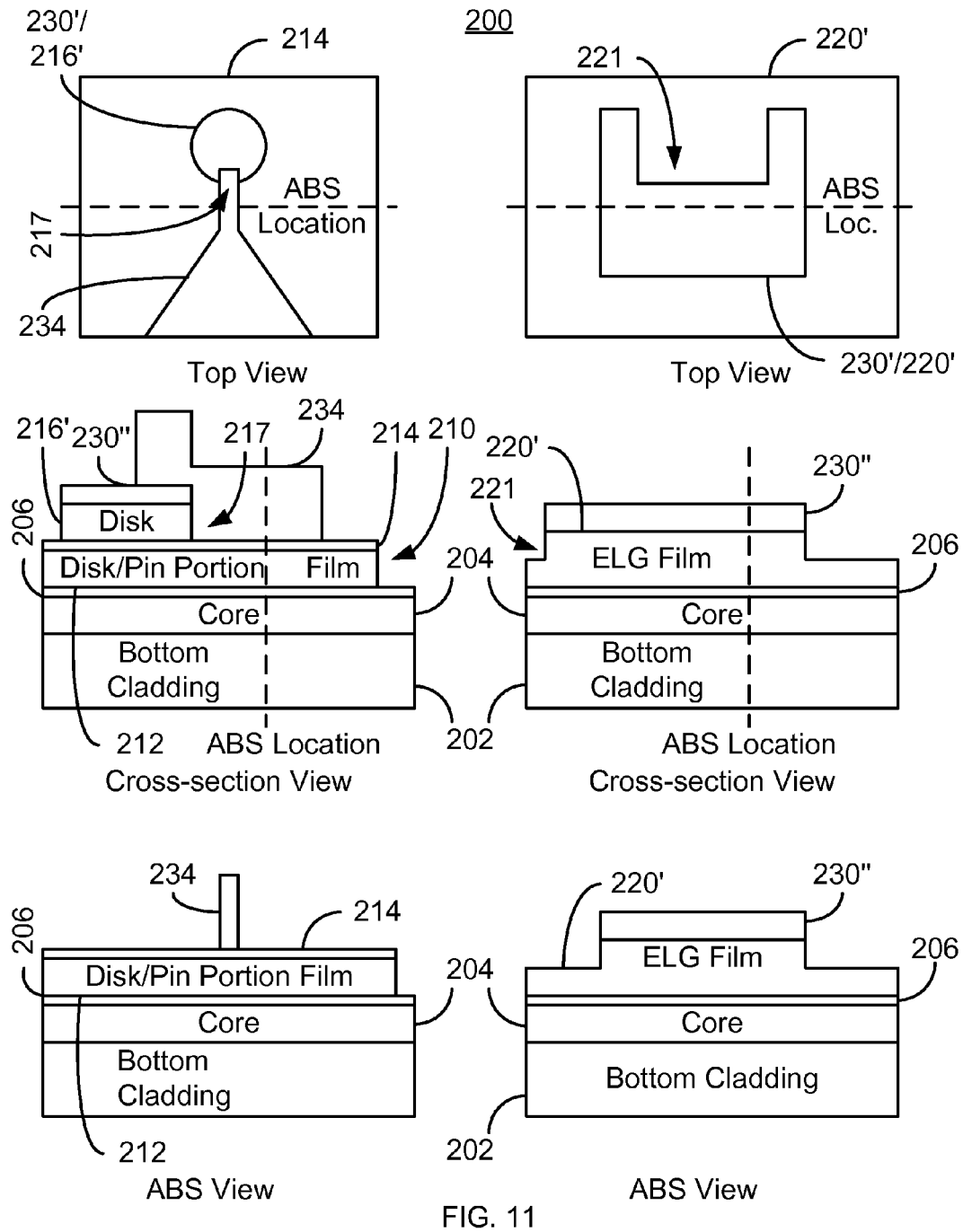

A pin portion mask is provided on an exposed portion of the NFT stack 210, via step 160. In the embodiment shown in FIGS. 6-16, the pin portion mask is provided on the exposed Ru layer 214 as well as on the disk portion 216'. FIG. 11 depicts the transducer 200 after step 160 is performed. Thus, a pin portion mask 234 is shown. The pin portion mask covers a portion of the Ru layer 214 between the disk portion 216' and the ABS location. As can be seen in FIG. 11, the pin portion mask also exposes the ELG region covered by the mask 230" of the ELG film 220'. The remaining hard mask 230" on the layer 216' may also define a disk portion in the lower disk/pin portion layer 212. Thus, the disk portion of the NFT is includes disk shaped-regions of layers 212, 214, and 216.

Figure 12:
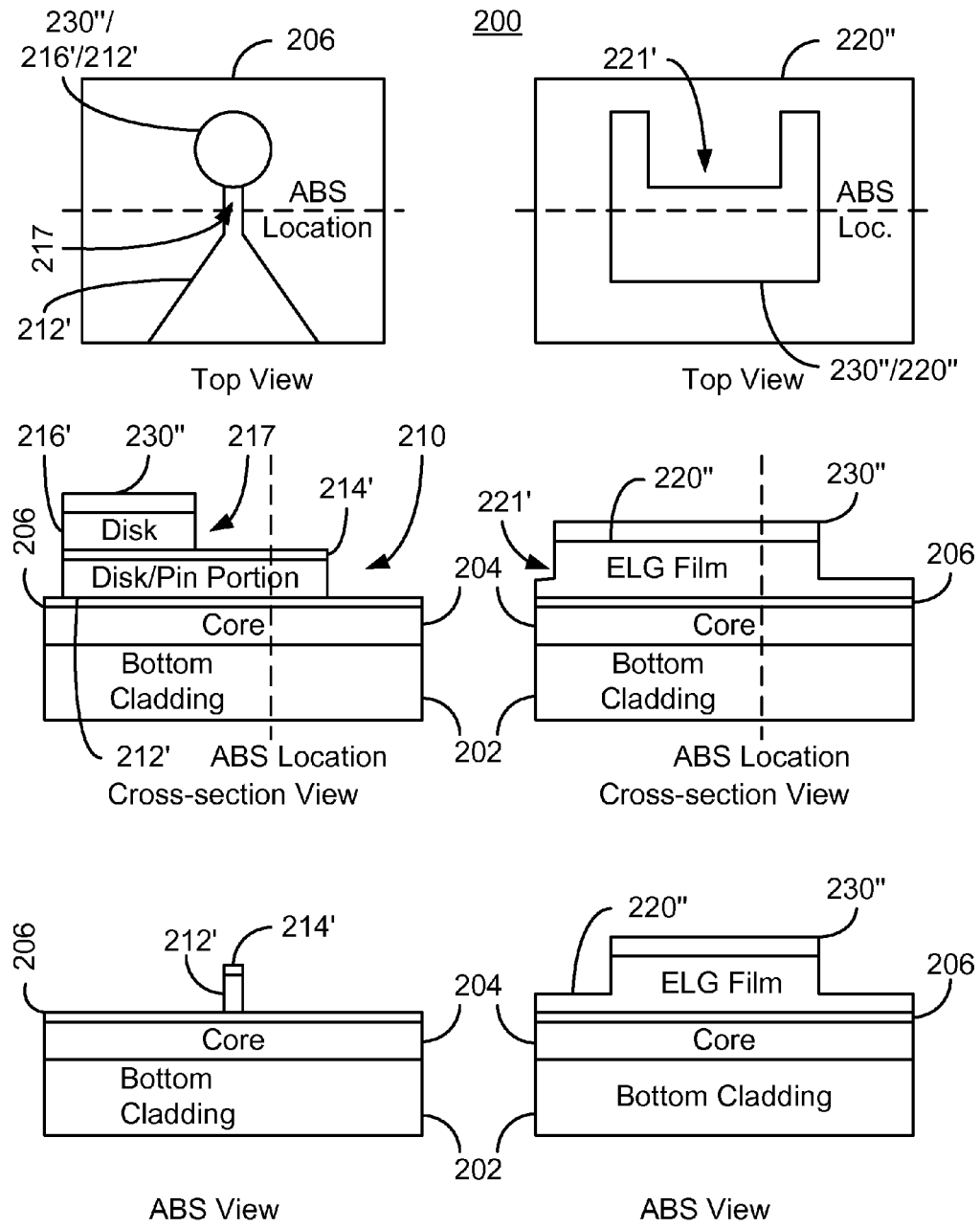

The exposed portion of the NFT film stack 210 is removed, via step 162. Step 162 may include performing a second ion mill. In addition, after the exposed portion of the NFT film stack 210 is removed, the mask 234 may be stripped. The second ion mill defines a pin portion of the NFT. Further, a disk region is defined below the disk portion film 216' in the disk/pin portion film 212. Because the ELG film 220' remains covered only by the hard mask 230', a portion of the ELG film 220' exposed by the hard mask is also removed. Consequently, definition of the ELG using the same mask as for the disk portion 216' continues. FIG. 12 depicts the transducer 200 after step 162 is performed. Thus, the disk/pin portion 212' has been formed. Further, as can be seen in the top view, both the disk portion 216' and the underlying portion of the disk/pin portion film 212' have the same (disk) shape distal from the ABS. As a result, formation of the NFT 210 is complete. The disk/pin portion 212' has the critical dimension between the ABS location and the front 217 of the disk region 212'/216'. In addition, The ELG 220' continues to be defined. The back edge 221' of the ELG 220" remains aligned with the front edge of the disk region 212'/216' because of the presence of the hard mask 230". In other embodiments, other portions of the EGL 220" remain aligned with the desired portions of the NFT 210.

Figure 13:
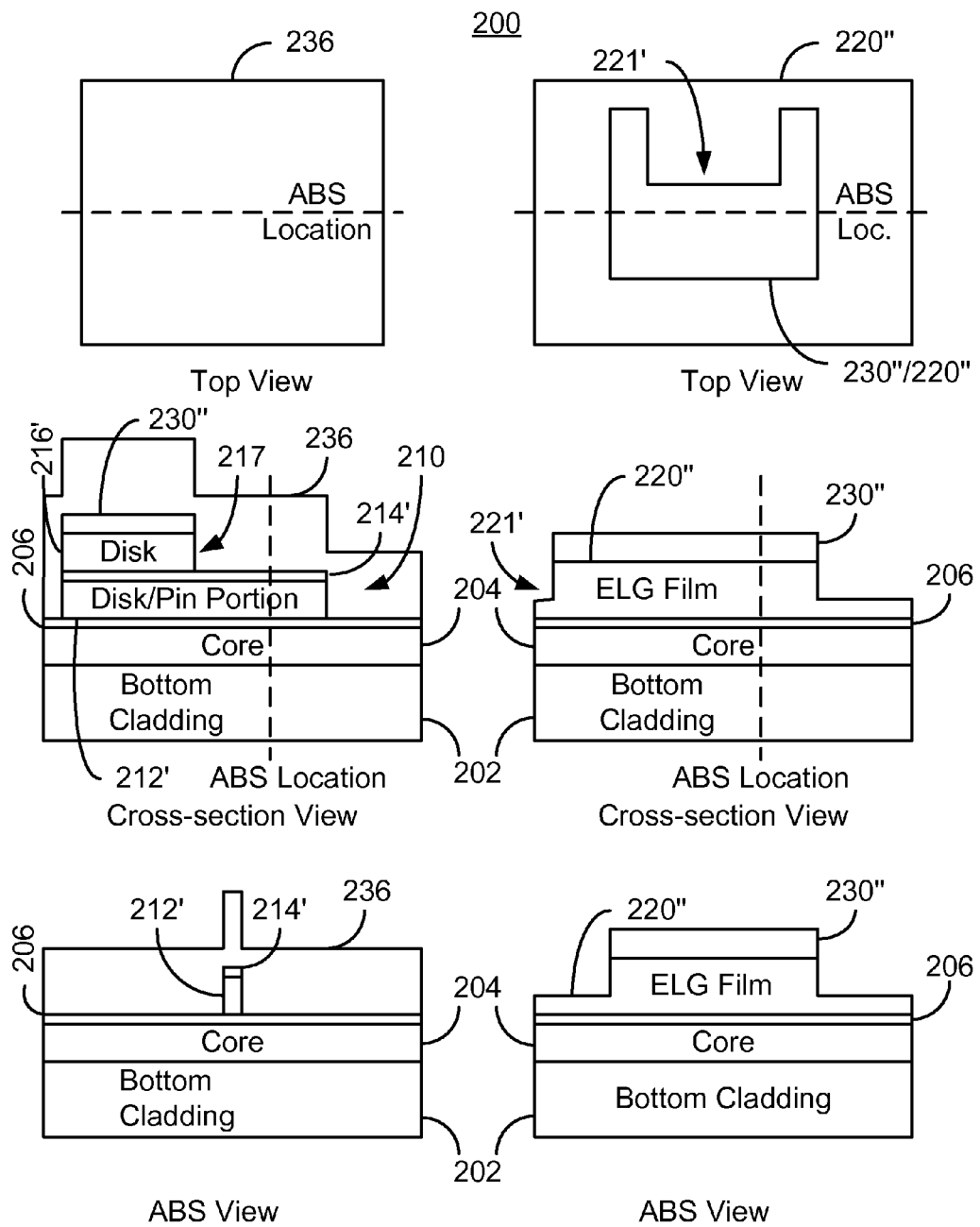

An NFT mask that covers the NFT 210 but exposes the ELG region covered by the mask 230" is provided, via step 164. In some embodiments, the NFT mask is a photoresist mask. Thus, step 164 includes depositing a photoresist layer and performing a photolithography step to define the NFT mask. FIG. 13 depicts the transducer 200 after step 164 is performed. Thus, the NFT 210 is covered by the mask 236. However, the ELG film 221' remains exposed.

Figure 14:
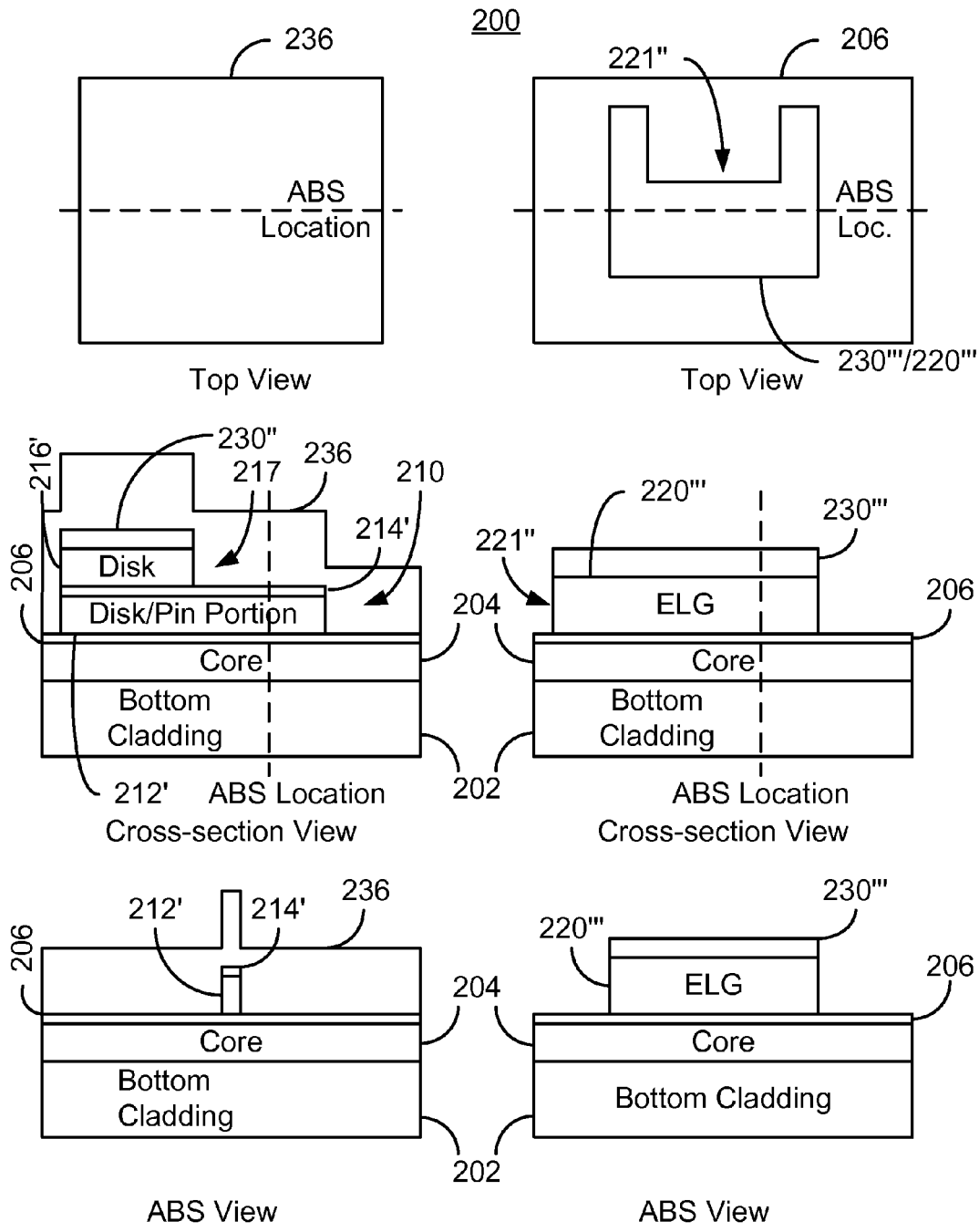
Figure 15:
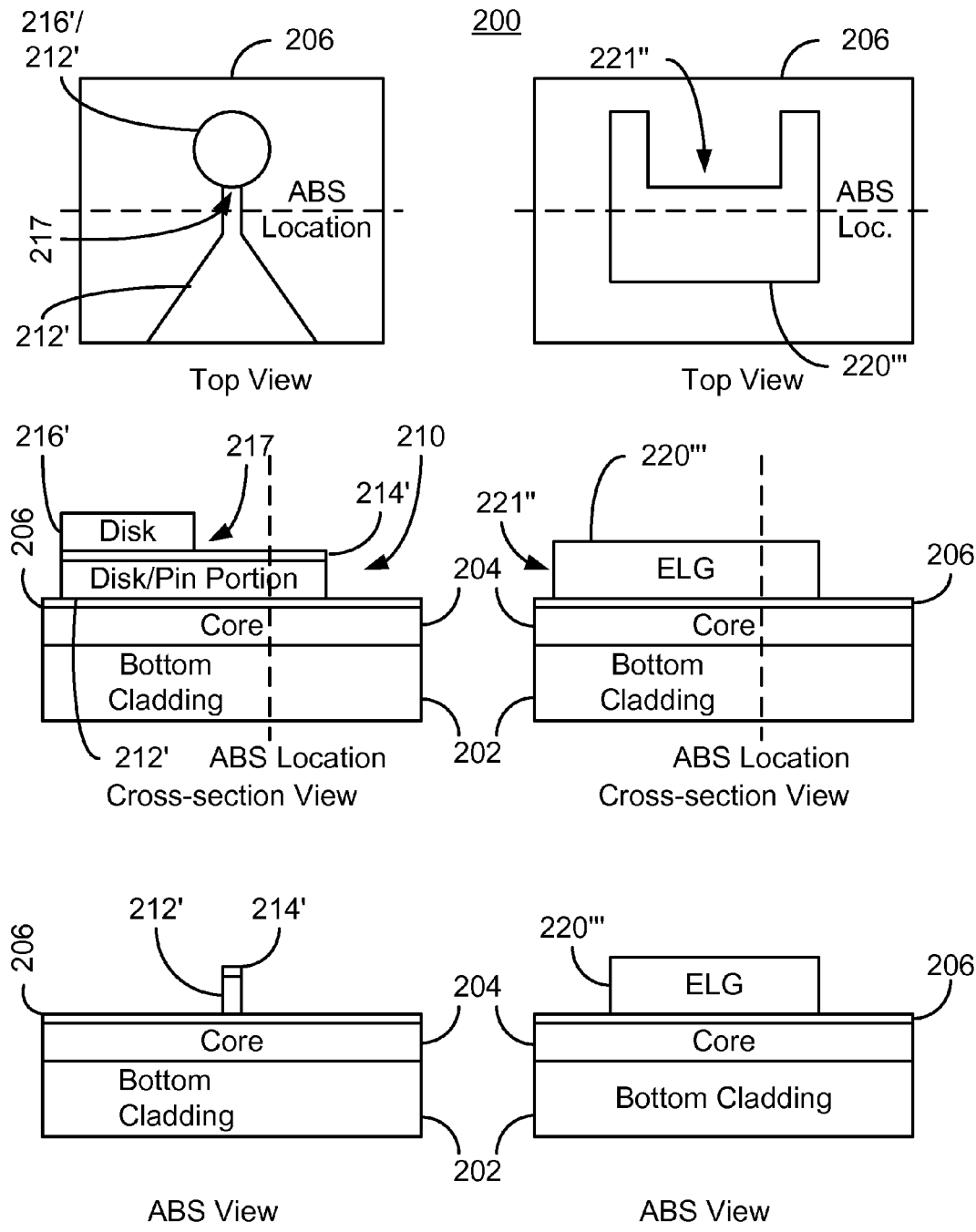

An exposed region of the ELG film 220" is removed, via step 166. Step 166 may include performing a third ion mill. In addition, the NFT mask 236 is removed in step 166. Removal of the NFT mask 236 may include a photoresist strip. The hard mask 230" may also be removed. FIG. 14 depicts the transducer 200 after the ion mill in step 166 is performed. Thus an ELG 220''' is formed in the ELG region. FIG. 15 depicts the transducer 200 after the NFT mask 236 and hard mask 230" have been removed. As can be seen in FIG. 15, the back edge 221" of the ELG 220" has a location that is the same distance from the ABS location as the front edge 217 of the disk portion 212'/216' of the NFT 210. Further, the ELG 220" is substantially coplanar with the disk portion 212'/216' of the NFT 210.

Figure 16:
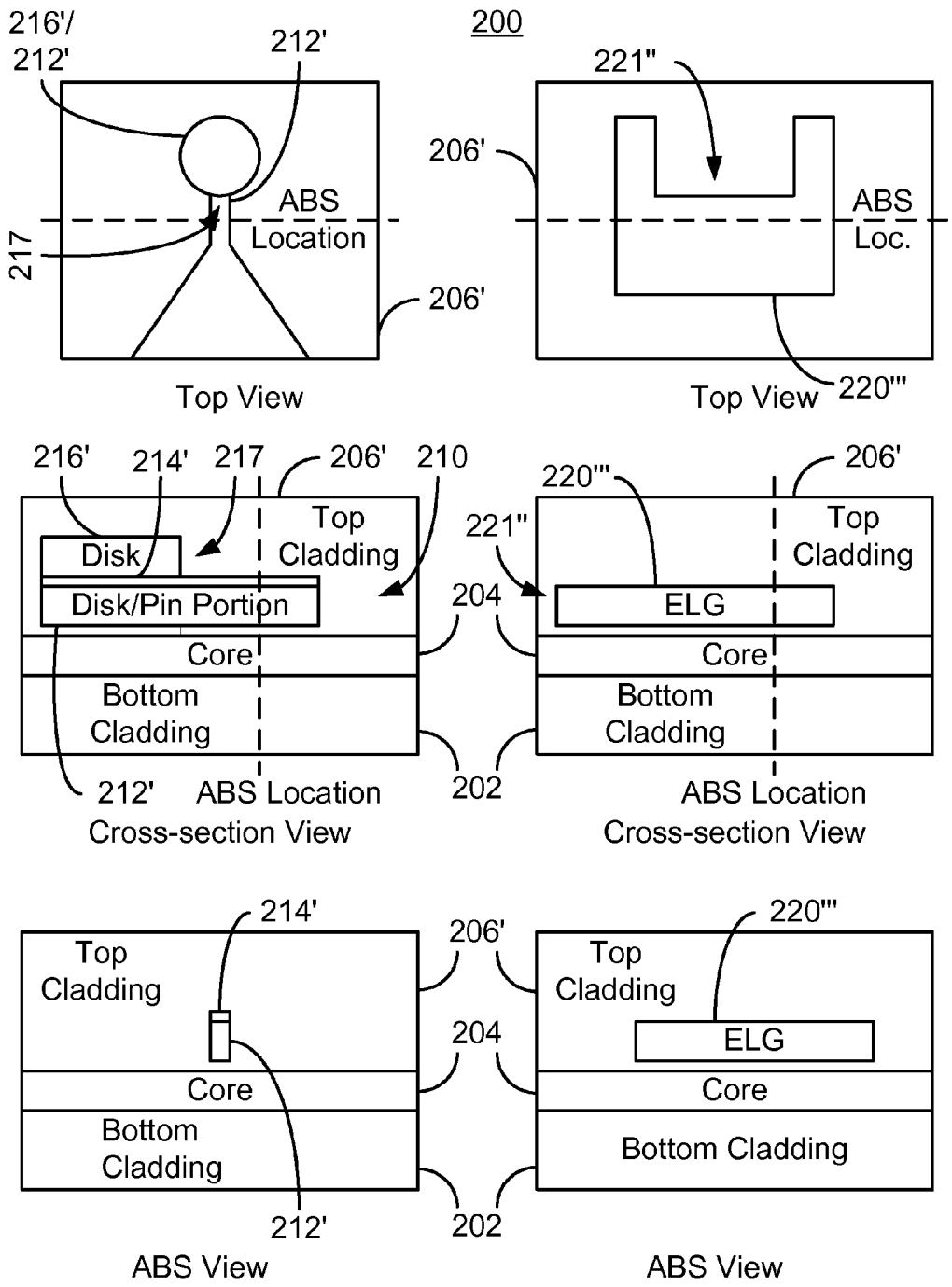

Structures above the NFT 210 and ELG 220" may be fabricated, via step 168. Step 168 may include completing formation of the top cladding, as well as formation of other portions of the write transducer, such as pole(s), shield(s), and coils. FIG. 16 depicts the transducer 200 after step 168 is completed. For clarity, only the portions of the transducer 200 previously shown and the remaining portion of the top cladding 206' are shown. Thus, the cladding 206' encases the NFT 210 and, in some embodiments, the ELG 220".

The transducer 200 is lapped, via step 170. Lapping removes the portion of the transducer below the ABS location in the top views of FIGS. 6-16 and to the right of the ABS location in the cross-section views of FIGS. 6-16. The lapping is terminated based on a signal from the ELG 220", via step 172. In some embodiments, the resistance of the ELG 220" during lapping is compared to a target resistance. Upon reaching the target resistance, lapping may be terminated. Alternatively, other considerations, such as windage, may be taken into account when terminating lapping.

Using the method 150, the transducer 200 may be formed. Because the ELG 220" is formed substantially coplanar with the NFT 210 and using the same masks and photolithography steps as the disk portion 212'/216' of the NFT 210, the ELG 220" is aligned with the NFT 210. Portions of the ELG 220" thus correspond to portions of the NFT 210. More specifically, in the embodiment shown, the back edge 221" of the ELG 220" may be substantially the same distance from the ABS location as the front edge 217 of the disk portion 212'/216' of the NFT 210. In other embodiments, other portions of the ELG 220" may correspond with the desired portions of the NFT 210. Thus, the ELG 220" may be used to terminate lapping when the desired distance is obtained between the ABS and the front edge 217 of the disk portion 216' of the NFT 210. Consequently, fabrication and performance of the NFT 210 and the EAMR transducer 200 may be improved.

We claim:

1. A method for providing at least one transducer having an air-bearing surface (ABS), the method comprising:
   providing at least one near-field transducer (NFT) film;
   providing an electronic lapping guide (ELG) film substantially coplanar with a portion of the at least one NFT film;
   defining a disk portion of an NFT from the portion of the at least one NFT film and at least one ELG from the ELG film, the disk portion corresponding to a critical dimension of the NFT from an ABS location; and
   lapping a portion of the at least one transducer including the at least one ELG, the lapping being terminated based on a signal from the at least one ELG.

2. The method of claim 1 wherein the step of defining the disk portion and the at least one ELG further includes:
   providing a mask covering the disk portion of the NFT of the at least one NFT film and the at least one ELG of the ELG film; and
   removing an exposed portion of the at least one NFT film and an exposed portion of the ELG film.

3. The method of claim 2 wherein the step of providing the mask further includes:
   providing a hard mask covering the disk portion and the at least one ELG.

4. The method of claim 3 wherein the step of removing the exposed portion further includes:
   ion milling the exposed portion of the at least one NFT film and the exposed portion of the ELG film, the ion milling leaving an exposed remaining portion of the at least one NFT film and an exposed remaining portion of the ELG film.

5. The method of claim 4 further comprising:
providing a pin portion mask on at least the exposed remaining portion of the at least one NFT film; and
defining a pin portion of the NFT, the pin portion having the critical dimension, at least part of the exposed remaining portion of the ELG film being removed.

6. The method of claim 5 wherein the step of defining the pin portion further includes:
performing an ion mill after the pin portion mask has been provided.

7. The method of claim 1 further comprising:
defining a pin portion of the NFT, the pin portion having the critical dimension.

8. The method of claim 1 wherein the disk portion has a circular cross section.

9. The method of claim 1 wherein the disk portion has a non-circular cross section.

10. The method of claim 9 wherein the disk portion has a rectangular cross section.

11. The method of claim 1 wherein the at least one NFT film further includes:
a first gold film;
a Ru film on the first gold film; and
a second gold film on the Ru layer.

12. The method of claim 1 wherein the ELG film includes Cr.

13. A method for providing a transducer having an air-bearing surface (ABS), the method comprising:
providing a near-field transducer (NFT) film stack including a first gold film, a Ru film on the first gold film and a second gold film on the Ru layer;
providing an electronic lapping guide (ELG) film substantially coplanar with the NFT film stack and including Cr;
providing a hard mask covering a disk portion of the NFT film stack and an ELG region of the ELG film;
performing a first ion mill, the first ion mill removing an exposed portion of the second gold layer and part of an exposed portion of the ELG film to form at least the disk portion of a NFT and a portion of the ELG, the first ion mill terminating while a portion of the Ru film and a portion of the ELG film remain intact;
providing a pin portion mask on an exposed portion of the Ru layer of the NFT film stack, the pin portion mask covering a portion of the Ru layer between the disk portion and the ABS, the pin portion mask also exposing an ELG region of the ELG film;
performing a second ion mill, the second ion mill defining a pin portion of the NFT and removing an additional portion of the ELG film outside of the ELG region, the pin portion having the critical dimension;
providing an NFT mask covering the NFT and exposing the ELG region;
removing an exposed region of the ELG film, forming an ELG in the ELG region, the ELG being substantially coplanar with the disk portion of the NFT; and
lapping a portion of the transducer including the ELG, the lapping being terminated based on a signal from the ELG.

* * * * *